(12) United States Patent  
Takai

(10) Patent No.: US 6,934,801 B2
(45) Date of Patent: Aug. 23, 2005

(54) DISK DEVICE HAVING CACHE MEMORY

(75) Inventor: Toshikazu Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 10/136,314

(22) Filed: May 2, 2002

(65) Prior Publication Data

US 2002/0169927 A1 Nov. 14, 2002

(30) Foreign Application Priority Data

May 10, 2001 (JP) .................................. 2001-139558

(51) Int. Cl.⁷ .............................................. G06F 12/00
(52) U.S. Cl. ........................................ 711/113; 711/120
(58) Field of Search ...................... 711/113, 111, 112, 711/120, 119, 118, 173, 170, 148, 165, 162, 122, 4, 171, 172; 710/53

(56) References Cited

U.S. PATENT DOCUMENTS

| | | | | |
|---|---|---|---|---|
| 5,689,679 A | * | 11/1997 | Jouppi | 711/122 |
| 5,884,098 A | * | 3/1999 | Mason, Jr. | 711/113 |
| 6,065,100 A | * | 5/2000 | Schafer et al. | 711/204 |
| 6,148,368 A | * | 11/2000 | DeKoning | 711/113 |
| 6,189,080 B1 | * | 2/2001 | Ofer | 711/170 |
| 6,389,509 B1 | * | 5/2002 | Berenguel et al. | 711/113 |
| 6,415,355 B1 | * | 7/2002 | Hirofuji | 711/114 |
| 6,622,226 B1 | * | 9/2003 | Dussud | 711/159 |
| 6,681,292 B2 | * | 1/2004 | Creta et al. | 711/119 |

* cited by examiner

Primary Examiner—Pierre-Michel Bataille
(74) Attorney, Agent, or Firm—Young & Thompson

(57) ABSTRACT

A cache memory in a disk device is constituted by a first cache memory for holding predetermined data to be written in the storing medium, a second cache memory for holding predetermined status read out from the storing medium and a third cache memory for holding predetermined data designated by the upper rank host.

20 Claims, 2 Drawing Sheets

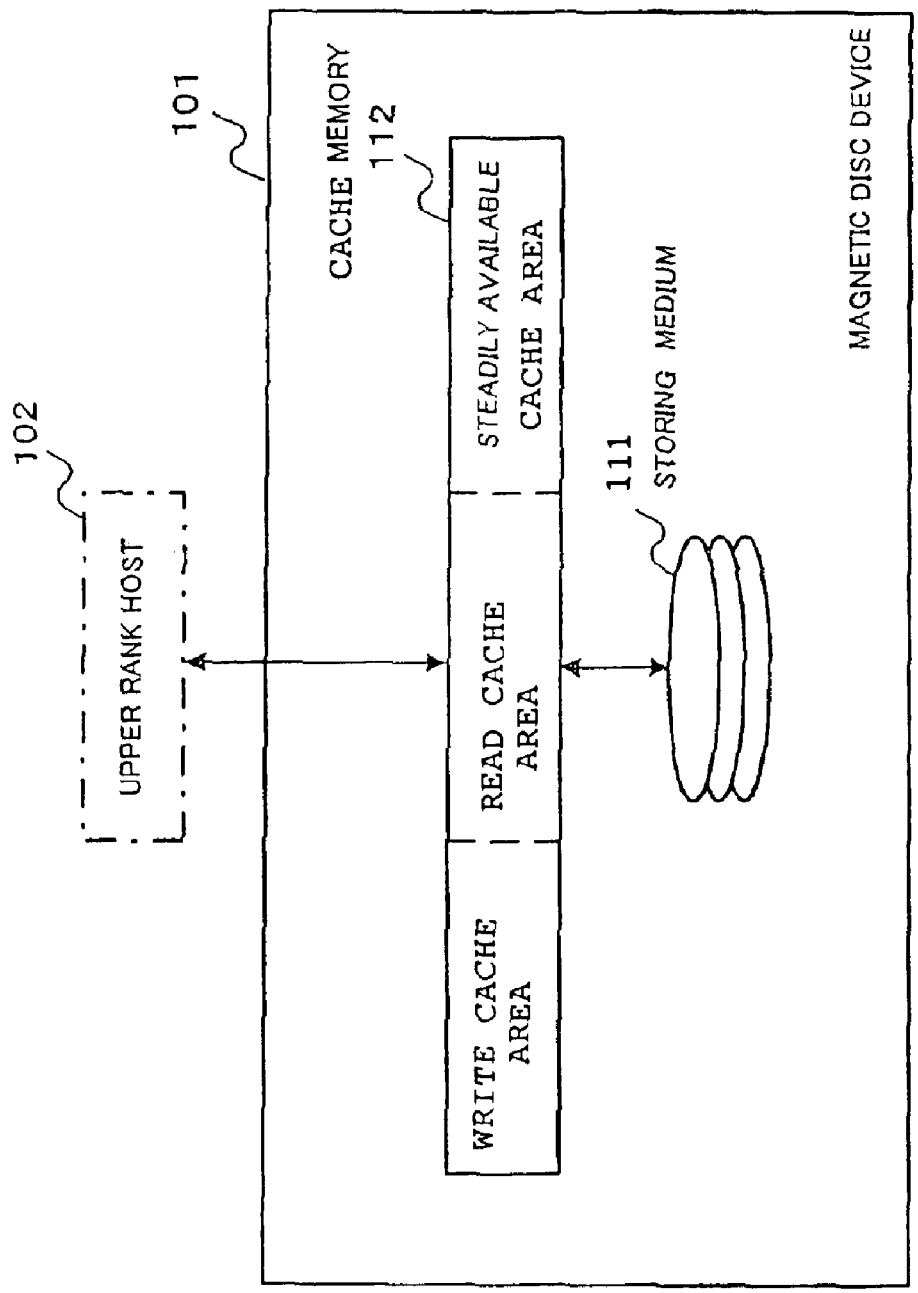

DISK DEVICE HAVING CACHE MEMORY

BACKGROUND OF THE INVENTION

This application claims benefit of Japanese Patent Application No. 2001-139558 filed on May 10, 2001, the contents of which are incorporated by the reference.

The present invention relates to disk devices and, more particularly, to a disk device having a cache memory for provisionally holding predetermined data read out into and stored in its storing medium.

A prior art disk device using a magnetic disk or the like as storing medium has a cache memory (or disk cache) for improving the access performance. The cache memory is a fast accessible memory for provisionally storing data to be written in the storing medium of the disk device or data read out from the storing medium in response to a command from an upper rank host.

Up to date, in databases or OSs (operating systems) data stored in a particular area is referred to as index or table, and it is thus demanded to be able to fast access the area, in which such index or the like has been stored.

To meet this demand, a method is adopted, in which index or table is held as steadily available data in a semiconductor disk or a main memory provided in a personal computer. In an alternative method that is adopted, it is determined that it is highly possible that index is held in a particular area (i.e., young address area) of a magnetic disk device (i.e., storing medium itself), and this area is held as steadily available area in a cache memory of the disk device.

In the former method, however, it is necessary to add predetermined semiconductor memory or main memory to the personal computer body, thus leading to additional expenditures. In the latter method, index of database or the like may not always be held in a young address area. Therefore, it is not always possible to fast access the index.

SUMMARY OF THE INVENTION

An object of the present invention is to provide a disk device capable of improving the access performance frequently accessed data without need of any additional device or member and reducing process time.

According to a first aspect of the present invention, there is provided a disk device comprising a storing medium for reading out and writing in predetermined data therefrom in response to a command from an upper rank host, and a cache memory for provisionally holding predetermined data to be written in and read out from the storing medium, wherein: the cache memory is constituted by a first cache memory for holding predetermined data to be written in the storing medium, a second cache memory for holding predetermined status read out from the storing medium and a third cache memory for holding predetermined data designated by the upper rank host.

In a second aspect, the disk device according to the first aspect, the third cache memory stores predetermined data held therein as steadily available data. In a third aspect, the disk device according to one of the first and second aspects, predetermined data held in the third cache memory is an index file of a predetermined database.

According to a fourth aspect of the present invention, there is provided a disk device comprising a storing medium for writing and reading out predetermined data in response to commands from an upper rank host and a cache memory for provisionally holding predetermined data to be written in and read out from the storing medium, wherein: the cache memory includes a first cache area for holding predetermined data written in the storing medium, a second cache area for holding predetermined data read out from the storing medium and a third cache area for holding predetermined data designated by the upper rank host.

In a fifth aspect, the disk device according to the fourth aspect, the third cache memory stores predetermined data held in it as steadily available data. In a sixth aspect, the disk device according to one of the fourth or fifth aspects, the predetermined data held in the third cache memory are of an index file.

With the above construction, the normal recess of writing and reading data in and from the storing medium in the disk device is executed quickly by using the first and second cache memories. Also, frequently accessible data are held in the third cache memory as steadily available data under the command from the upper rank host. Since frequently utilized data are held as steadily available data in the cache memory which can be accessed faster than the storing medium, it is possible to increase the rate of process operation in the upper rank host. Also, since the cache memory is preliminarily provided, it is possible to suppress expenditures for additional device or the like.

Furthermore, according to the present invention the cache memory has a structure including a first cache area for holding predetermined data to be written in the storing medium, a second cache area for holding predetermined data to be read out from the storing medium and a third cache memory for holding predetermined data designated by the upper rank host.

With this structure as well, the same function and advantages are obtainable, and the above object can be attained. It is also possible to reduce the number of components of the disk device and reduce cost thereof.

Other objects and features will be clarified from the following description with reference to attached drawings.

BRIEF DESCRIPTION OF THE DRAWINGS

FIG. 2 shows a block diagram of a second embodiment of the present invention according to the present invention.

PREFERRED EMBODIMENTS OF THE INVENTION

Figure 1:
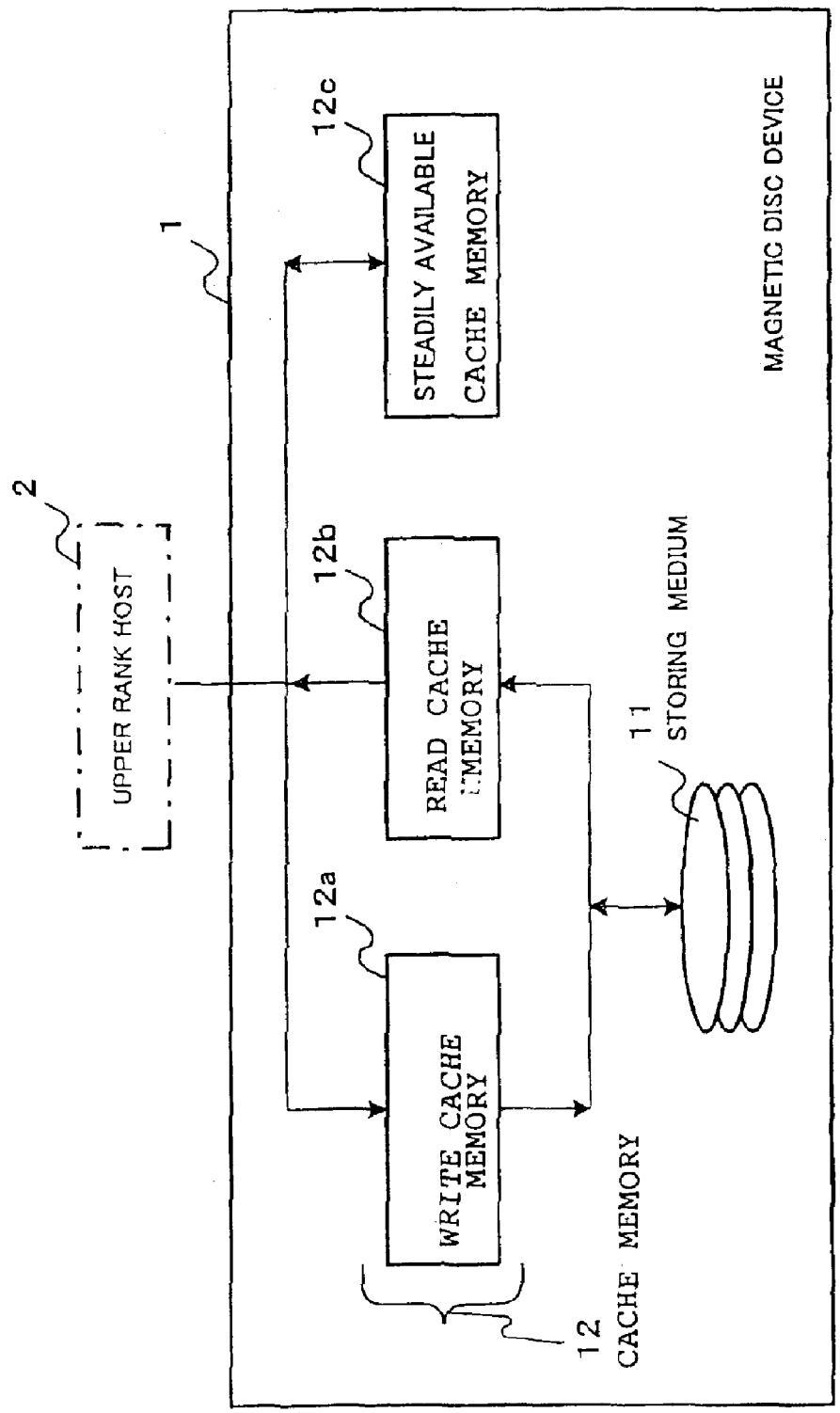
FIG. 1 shows a block diagram of a first embodiment of the present invention according to the present invention.

Preferred embodiments of the present invention will now be described with reference to the drawings.

The disk device 1 shown in FIG. 1 includes a storing medium 11 for reading out or writing in predetermined data therefrom in response to a command from an upper rank host 2 and a cache memory 12 for provisionally holding predetermined data to be written in and read out from the storing medium 11.

The upper rank host 2 is a computer such as a personal computer operable by the user. This upper rank host 2 includes a processor (CPU) capable of performing predetermined operational process and a main memory (not shown) for provisionally storing predetermined programs providing predetermined functions when assembled in the processor and also predetermined data to be processed in the processor. The main memory is constituted by, for instance, a DRAM (dynamic DRAM).

The disk device 1 is a magnetic disk device using magnetic disks as the storing medium 11. Data are written in and read out from the storing medium 11 by using a magnetic head (not shown) in response to commands from the upper rank host 2.

When writing the data in the storing medium 11 by using the magnetic head, it takes time (seek time) for the magnetic head to load to the position on the storing medium 11 and shift to desired tracks of the storing medium 11. In other words, a predetermined time is taken until completion of the process of writing all data transmitted from the upper rank host 2. For this reason, the written data having been transmitted from the upper rank host 2 are provisionally stored in the above cache memory 12, and are written from the cache memory 12 in the storing medium 11 when desired. The cache memory 12 is constituted by an SRAM (static RAM) which can be accessed faster than the above main memory (not shown).

The cache memory 12 includes a first cache memory 12a for holding predetermined data to be written in the storing medium 11, a second cache memory 12b for holding predetermined data read out from the storing medium 11 and a third cache memory 12c for holding predetermined data designated by the upper rank host. That is, the three separate cache memories 12 are provided in the magnetic disk device 1.

The first cache memory 12a is a write cache memory for provisionally storing data, which is transmitted from the upper rank host 2 to be stored in the storing medium 11, before writing the data therein. This write cache memory 12a has a predetermined storage capacity. Thus, even when the data transmitted from the upper rank host 1 to the magnetic disk device 1 is not subject to the process of its writing in the storing medium 11, subsequently transmitted data to be written is held in the write cache memory 12a. The upper rank host 2 thus can execute the next process without waiting the completion of the operation of writing the data in the magnetic disk device 1.

The second cache memory 12b is a read cache memory for provisionally storing data read out from the storing medium 11 in response to a command from the upper rank host 11. This read cache memory 12b holds data once read out until the lapse of a predetermined time, i.e., until the read cache memory 12b no longer has any vacant capacity. Thus, a command for reading out the same data is issued afresh from the upper rank host 2, the data can be read out from the read cache memory 12b. It is thus possible to improve the access speed and also improve the process speed. This is so because, as noted before, the read cache memory 12b is constituted by the fast accessible SRAM and also because the process of reading data, if any, from the storing medium 11 takes time due to the shift time (or seek time) of the magnetic head and so forth.

The third cache memory 12c, unlike the write and read cache memories 12a and 12b, is one (steadily available data cache memory) irrelevant to access to the storing medium 11. Frequent access data are stored in the third cache memory 12c in response to a command from the upper rank host 2. Data stored in the third cache memory 12c are stored as steadily available data in the third cache memory 12c.

Data stored in the steadily available cache memory 12c constitute a predetermined table, for example, which is referred to in data base index file or operating system. These data are normally stored in the storing medium 11, but they may be held in the read cache memory 12b because they are frequently accessed by the upper rank host 2. However, these data are not always held in the read cache memory 12b. When these data are not held in the read cache memory 12b, they have to be read out from the storing medium 11 whenever needed, thus giving rise to a delay in the process. Since no data re-writing is executed unless a re-writing command is issued from the upper rank host 2, by string frequently used data as steadily available data in the fast accessible steadily available data cache memory 12c it is possible to permit access-time reduction with reference to the steadily available data cache memory 12c.

In this case, the date stored in steadily available data memory 12c are not limited to the above database index file or like data present such as to be stored in the steadily available cache memory 12c. For example, the data which are frequently utilized in the upper rank host 2 may be stored in the steadily available cache memory 12c. In other words, the upper rank host 2 may be provided with a function of storing predetermined files in the steadily available cache memory 12c on the basis of the access frequency while monitoring the access frequency of the files (i.e., data). Thus, the data which are subjected to concentrated operations are stored in the steadily available data cache memory 12c which, unlike the read cache memory 12b, is not frequently rewritten. It is thus possible to improve the speed of accessing the data and reduce the data processing time. Also, since the number of times of executing the process of writing and reading data in and from the storing medium 11 are restricted, it is possible to suppress the burden on the storing medium 11 and magnetic head (not shown).

In this way, no fast accessible memory or the like is additionally purchased and mounted on a computer or the like afterwards any more, and the cache memory 12 in the magnetic disk device 1 is utilized as the steadily available data cache memory 12c. It is thus possible to reduce the process time as well as suppressing expenditures for additional components.

While the above embodiment has concerned with the magnetic disk device 1 as an example of the disk device, it is possible to use a hard disk device or a floppy disk device in lieu of the magnetic disk device 1. It is further possible to use an optical disk device in lieu of the magnetic disk device 1. Furthermore, the cache memory 12 is not limited to the above RAM.

A second embodiment of the present invention will now be described with reference to FIG. 2. FIG. 2 is a block diagram showing the construction of the second embodiment.

As shown in FIG. 2, this embodiment is a magnetic disk device 101 which have substantially the same components as in the previous first embodiment. In the second embodiment, a single cache memory 112 is used, which includes a first cache area (write cache area) 112a for holding predetermined data to be written in the storing medium 111, a second cache area (read cache area) 112b for holding predetermined data read out from the storing medium 111 and a third cache memory (steadily available data cache area) 112c for holding predetermined data designated by the upper rank host 102.

In other words, the cache memory 112 has three independent storing areas to be utilized. The area designation may be set on the basis of predetermined rate or capacity, or it may be set by being updated in dependence on the circumstance of use. As an example, where much data are read out, the storing capacity of the read cache memory 112b may be set greatly.

Also, as in the previous case, when a command for storing frequently accessible data as steadily available data in the cache memory 112 is issued from the upper rank memory, the data are stored by accessing the steadily available data cache memory 112c in the cache memory 112. The data in the steadily available data cache area 112c are not re-written by executing read-out from and writing in the storing medium 111 of the magnetic disk device 101.

Thus, like the first embodiment, data which are frequently used by the upper rank host 102 are stored as steadily available data in the fast accessible cache memory 112, and it is thus possible to reduce the data access time and improve the operation rate of predetermined processes in the upper rank host 102. In addition, although the capacity of the cache memory provided in the magnetic disk device 101 may be increased, the number of cache memories is not increased, and it is thus possible to simplify and the device and reduce cost thereof.

As has been described in the foregoing, the above construction according to the present invention is provided with a cache memory for storing frequent access data for storing frequent access data as steadily available data. It is thus possible to obtain excellent advantages that it is possible to fast access the stored data and improve the operation rate of the processes in the upper rank host.

Besides, the upper rank host or the like is not required to add any new component memory or the like, thus precluding man-our or expenditure of addition of any such component.

Furthermore, where a steadily available data is formed in a cache memory, frequent access data are stored as steadily available data in this area. It is thus possible to reduce access time and restrict the cache memory number increase as desired from the standpoint of the cost reduction of the product.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A disk device comprising a storing medium for reading out and writing in predetermined data therefrom in response to a command from an upper rank host, and a cache memory for provisionally holding predetermined data to be written in and read out from the storing medium, wherein:

the cache memory is constituted by a first cache memory for holding predetermined data to be written in the storing medium, a second cache memory for holding predetermined data read out from the storing medium and a third cache memory for holding predetermined data designated by the upper rank host.

2. The disk device according to claim 1, wherein the third cache memory stores the predetermined data held therein as steadily available data.

3. The disk device according to claim 1, wherein the predetermined data held in the third cache memory is an index file of a predetermined database.

4. A disk device comprising a storing medium for writing and reading out predetermined data in response to commands from an upper rank host and a cache memory for provisionally holding predetermined data to be written in and read out from the storing medium, wherein:

the cache memory includes a first cache area for holding predetermined data written in the storing medium, a second cache area for holding predetermined data read out from the storing medium and a third cache area for holding predetermined data designated by the upper rank host.

5. The disk device according to claim 4, wherein the third cache memory stores the predetermined data held in it as steadily available data.

6. The disk device according to claim 4, wherein the predetermined data held in the third cache memory are of an index file.

7. The disk device according to claim 2, wherein the predetermined data held in the third cache memory is an index file of a predetermined database.

8. The disk device according to claim 5, wherein the predetermined data held in the third cache memory are of an index file.

9. A disk storing device for reading out and writing in predetermined data therefrom in response to a command from an upper rank host, comprising:

a disk storing medium;

a data connection to the upper rank host;

a write cache memory area connected to the data connection and connected to the disk storing area, the write cache memory area for provisionally holding data, transmitted from the upper rank host for writing to the disk storing medium, to be written into the disk storing medium;

a read cache memory area connected to the data connection, connected to the write cache memory area, and connected to the disk storing area, the read cache memory area for provisionally holding data read from the disk storing medium for subsequent reading out by the upper rank host; and a steadily available cache memory area, steadily available for reading by the upper rank host, connected to the data connection and connected to the disk storing medium via the write cache memory area and via the read cache memory area, the steadily available cache memory area for holding predetermined data designated by the upper rank host.

10. The disk storing device according to claim 9, wherein the predetermined data held in the steadily available cache memory area is an index file of a predetermined database.

11. The disk storing device of claim 9, wherein each of the write cache memory area, the read cache memory area, and the steadily available cache memory area are constituted by random access memory.

12. The disk storing device of claim 9, wherein each of the write cache memory area, the read cache memory area, and the steadily available cache memory area are constituted by volatile memory.

13. The disk storing device of claim 1, wherein each of the first cache memory, the second cache memory, and the third cache memory are constituted by random access memory.

14. The disk storing device of claim 1, wherein each of the first cache memory, the second cache memory, and the third cache memory are constituted by volatile memory.

15. The disk storing device of claim 4, wherein each of the first cache area, the second cache area, and the third cache area are constituted by random access memory.

16. The disk storing device of claim 4, wherein each of the first cache area, the second cache area, and the third cache area are constituted by volatile memory.

17. The disk storing device according to claim 9, wherein the predetermined data held in the steadily available cache memory area is a stored file determined by the upper rank host on a basis of access frequency to data of the file.

18. The disk storing device of claim 1, wherein the disk storing device is a single disk drive unit.

19. The disk storing device of claim 9, wherein the disk storing device is a single disk drive unit.

20. The disk storing device of claim 9, wherein the steadily available cache memory area is connected to the disk storing medium only via the write cache memory area and via the read cache memory area so that any access to the disk storing medium by the steadily available cache memory area is via one of the write cache memory and the read cache memory.

* * * * *